United States Patent
Zellerhoff et al.

(10) Patent No.: US 12,219,091 B2
(45) Date of Patent: Feb. 4, 2025

(54) ENHANCED CALL WAITING FOR USER EQUIPMENT

(71) Applicant: T-Mobile Innovations LLC, Overland Park, KS (US)

(72) Inventors: Nicholas Benjamin Zellerhoff, Kirkland, WA (US); Hang Hoi Yau, Sammamish, WA (US); Hsin-Fu Henry Chiang, Bellevue, WA (US); Ali Daniali, Tukwila, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 368 days.

(21) Appl. No.: 17/645,576

(22) Filed: Dec. 22, 2021

(65) Prior Publication Data
US 2023/0199113 A1    Jun. 22, 2023

(51) Int. Cl.
*H04M 3/428* (2006.01)
*H04W 4/16* (2009.01)

(52) U.S. Cl.
CPC ....... *H04M 3/4286* (2013.01); *H04M 3/4285* (2013.01); *H04W 4/16* (2013.01)

(58) Field of Classification Search
CPC ............. H04M 3/4286; H04M 3/4285; H04M 3/4288; H04W 4/16
See application file for complete search history.

(56) References Cited

U.S. PATENT DOCUMENTS

| | | | | |
|---|---|---|---|---|
| 6,621,420 B1 * | 9/2003 | Poursartip | ............. | G08G 1/087 340/906 |
| 2011/0293078 A1 * | 12/2011 | Saylor | ................... | H04M 3/493 379/88.13 |
| 2013/0029645 A1 * | 1/2013 | Schentrup | ........... | H04M 3/4283 455/414.1 |
| 2015/0049157 A1 * | 2/2015 | Krishnamoorthy | ......................... | H04L 65/1089 348/14.1 |
| 2018/0103358 A1 * | 4/2018 | Chiang | ................. | H04M 3/428 |
| 2020/0177647 A1 * | 6/2020 | Ravichandran | ........ | H04N 7/152 |

OTHER PUBLICATIONS

Sim, Khe Chai. "Haptic voice recognition: Augmenting speech modality with touch events for efficient speech recognition." 2010 IEEE spoken language technology workshop. IEEE, 2010. (Year: 2010).*

AlAlawi, Khamis, and Hussain Al-Aqrabi. "Quality of service evaluation of VoIP over wireless networks." 2015 IEEE 8th GCC Conference & Exhibition. IEEE, 2015. (Year: 2015).*

* cited by examiner

*Primary Examiner* — Sharad Rampuria
(74) *Attorney, Agent, or Firm* — Shook, Hardy & Bacon L.L.P.; Elena K. McFarland

(57) ABSTRACT

While a first UE is engaged in an active call with a third UE, the first UE may receive an incoming call from a second UE. An option is presented on a display of the first UE to place this incoming call on hold. In response to receiving touch input selecting the option to place the second UE on hold, one or more communications may be sent to the second UE on hold, such as interactive or non-interactive video or audio. As a result, the call experience may be enhanced. In particular, the user of the first UE may no longer incur the stress that comes with either having to flip back and forth between calls or make a decision whether to decline an incoming call. And the user of the second UE may be more likely to wait on hold until the first call has ended.

20 Claims, 5 Drawing Sheets

ENHANCED CALL WAITING FOR USER EQUIPMENT

BACKGROUND

Call waiting, which helps to ensure that a mobile phone (user equipment (UE)) user does not miss important calls while the user is engaged in another call, is an important UE feature. The call-waiting capabilities for current UEs, however, are limited. For example, the user can be given the option to decline the incoming call and continue with the active call; answer the incoming call and end the active call; or answer the incoming call and place the active call on hold. In other examples, when declining the incoming call, the user may be given the additional option to send a text message, pre-configured or otherwise, to the declined caller. These examples, however, all have drawbacks. If a user answers an incoming call and places the active caller on hold, the user is left with the stress of juggling multiple calls. Moreover, the holder is left on the line in silence, which will likely result in the holder becoming annoyed and hanging up. If a user declines the incoming call and continues with the active call, the user is denied the ability to communicate with the incoming caller, and the incoming caller may be confused and/or offended because no explanation was provided for the termination. In addition, if the user is given the option to send a text message to the incoming caller, the message may be too formal for an incoming personal call (or otherwise not "sound-like" the user that sent the message) and/or too informal for an incoming business call.

SUMMARY

The present disclosure is directed, in part, to enhanced call waiting for UEs, substantially as shown in and/or described in connection with at least one of the figures, and as set forth more completely in the claims. In contrast to conventional approaches, when a user of a UE receives an incoming call while currently engaged in another call, a menu may be presented on the display of the UE that allows the user to place the incoming call on hold and cause one or more communications to be sent to the incoming caller while this incoming call is on hold. For example, in certain embodiments, the user may cause the sending of an interactive video to a UE of the incoming caller. In this way, the drawbacks of conventional approaches may be ameliorated. The user may no longer have to juggle multiple calls and instead may take the time necessary to complete the first call. Moreover, by providing meaningful communications to the incoming caller, the incoming caller may more likely remain on the line until completion of the first call. This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Illustrative embodiments of the present invention are described in detail below with reference to the attached figures, which are intended to be exemplary and non-limiting, wherein.

DETAILED DESCRIPTION

Figure 1A:
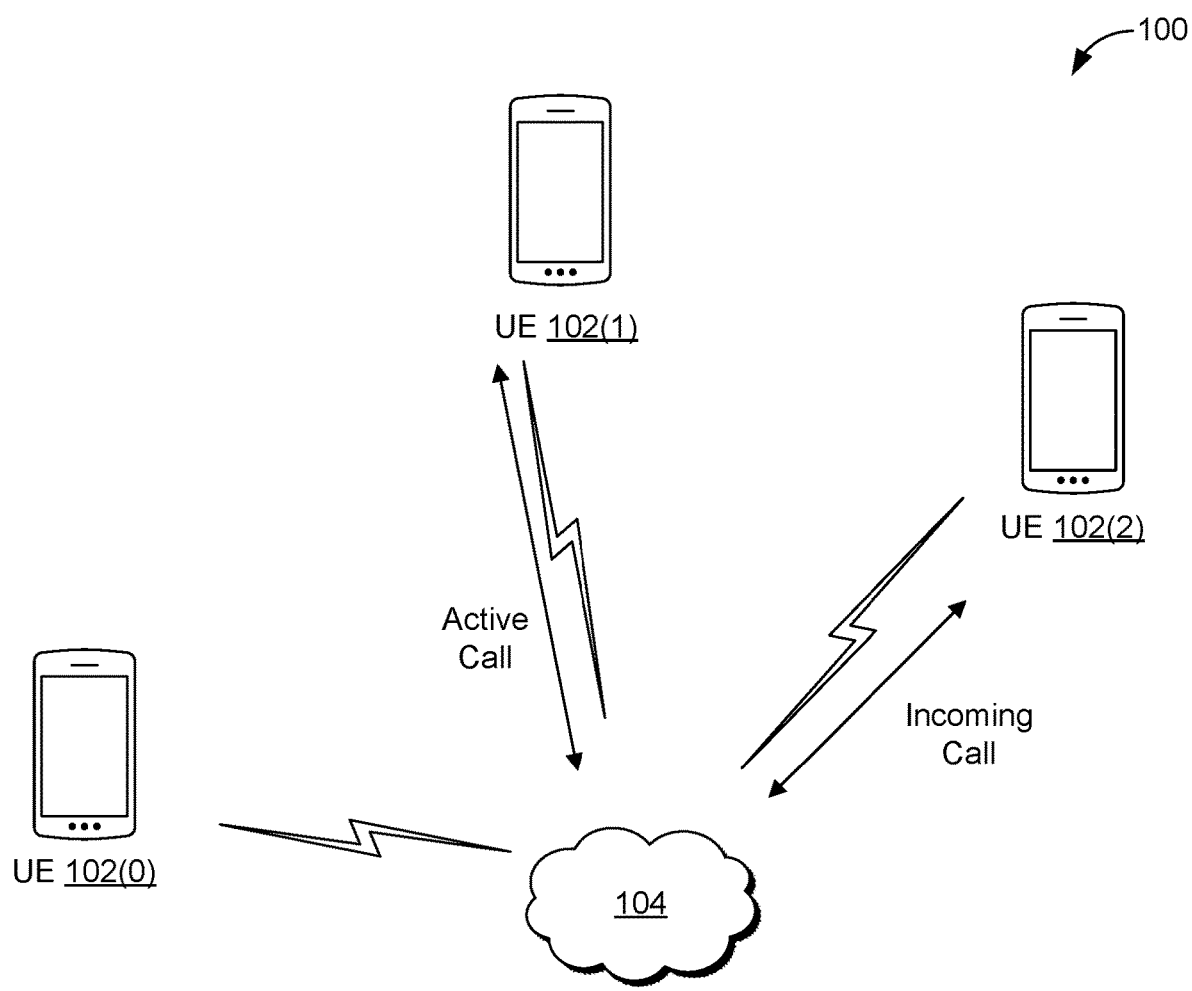
FIG. 1A illustrates a high-level example of a network environment in accordance with embodiments of the present disclosure.

Systems, methods, and computer-readable media are disclosed that relate to enhanced call waiting functionality for UEs. The subject matter of embodiments of the invention is described with specificity herein to meet statutory requirements. However, the description itself is not intended to limit the scope of this patent. The claimed subject matter might be embodied in other ways to include different steps or combinations of steps similar to the ones described in this document, in conjunction with other present or future technologies. Terms should not be interpreted as implying any particular order among or between various steps herein disclosed unless and except when the order of individual steps is explicitly described.

In certain aspects, call waiting methods are provided for a UE. In embodiments, the user of a first UE may be engaged in a call with the user of a third UE and may receive an incoming call from the user of a second UE. When the user of the first UE receives the incoming call from the user of the second UE, a menu may be presented on a display of the first UE. This menu may include one or more options, such as but not limited to, an option to place the incoming call from the user of the second UE on hold. The first UE may receive a touch input from the user of the first UE indicating the option to place the incoming call on hold from the user of the second UE. This touch input may cause one or more communications to be sent to the second UE while the second caller remains on hold. In embodiments, the one more communications may comprise one or more interactive messages and/or non-interactive messages in audio and/or video form. In this way, the call experience for both the user of the first UE (e.g., the called party currently engaged in another call) and the user of the second UE (e.g., the party calling the called party currently engaged in another call) is enhanced. More particularly, the called party no longer incurs the stress that comes with either having to flip back and forth between calls or make a decision whether to decline an incoming call. Instead, the called party may take the time necessary to complete the first call before entertaining the second call and without having to make a decision whether to decline the second call. Moreover, the experience of the party currently engaged in a call with the called party will remain unaffected. In addition, the calling party will not be confronted with an abrupt termination of the call, such as when the called party declines the call. Nor will the calling party be confronted with silence, such as when the user accepts the called party's call and then places the called party on hold. And in light of the one or more communications that are sent to the calling party during the hold period, the calling party may be more likely to wait until the first call has ended.

In other aspects, a system in a communications network is provided comprising a processor and one or more computer storage hardware devices. The one or more computer storage hardware devices may store computer-usable instructions that, when used by the processor, cause the processor to receive a second voice call from a second UE while a first UE is engaged in a first voice call. The one or more computer storage hardware devices may also store computer-usable instructions that, when used by the processor, cause the processor to present a menu on a display of the first UE. The menu may comprise one or more options, including an option to place the second voice call on hold. In addition, the one or more computer storage hardware devices may store computer-usable instructions that, when used by the processor, cause the processor to receive a touch input from the user of the first UE indicating that the user of the first UE has selected the option to place the second voice call on hold. The one or more computer storage hardware devices may also store computer-usable instructions that, when used by the processor, cause the sending of one or more communications to the second UE while the second voice call is on hold.

In still further aspects, a computer-readable storage media having stored thereon executable instructions that when executed by a processor of a computing device may control the computing device to perform steps for a call waiting method is provided. The steps may include receiving a second voice call from a second UE while a first UE is engaged in a first voice call. The steps may also include causing a menu to be presented on a display of the first UE. The menu may comprise an option to place the second voice call on hold. The steps may further include receiving a touch input indicating a selection to place the second voice call on hold. In addition, the steps may include causing one or more communications to be sent to the second UE while the second voice call is on hold.

FIG. 1A depicts a high-level example of a network environment 100 in accordance with embodiments of the present disclosure. The network environment 100 is but one example of a suitable network environment and is not intended to suggest any limitation as to the scope of use or functionality of the disclosure. Neither should the network environment 100 be interpreted as having any dependency or requirement relating to any one or combination of components illustrated. The network environment 100 may comprise a communications network 104 and multiple UEs, such as UEs 102(0)-102(2). In embodiments, the UE 102(0) and the UE 102(1) may be engaged in an active call that has been routed over the communications network 104, and the UE 102(2) may have placed a call to the UE 102(0) that has been routed over the communications network 104. The terms "user equipment," "UE," and "user device" are used interchangeably to refer to a device employed by an end-user that communicates using a network, such as the communications network 104, and that is capable of transmitting/receiving data using any suitable wired or wireless communications/data technology, protocol, or standard, such as Global System for Mobile Communications (GSM), Time Division Multiple Access (TDMA), Universal Mobile Telecommunications System (UMTS), Evolution-Data Optimized (EVDO), Long Term Evolution (LTE), Advanced LTE (LTE+), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), Voice over LTE (VoLTE), IEEE 802.1x protocols, WiMAX, Wi-Fi, Data Over Cable Service Interface Specification (DOCSIS), digital subscriber line (DSL), and/or any future IP-based network technology or evolution of an existing IP-based network technology.

UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant (PDA), a wearable device, a fitness tracker, an in-vehicle (e.g., in-car) computer, or any other device capable of communicating using one or more resources of the network, such as but not limited to, a television (smart television), set-top-box (STB), game console, desktop computer, and the like, configured to communicate over the communications network 104. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies, current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such.

Figure 1B:
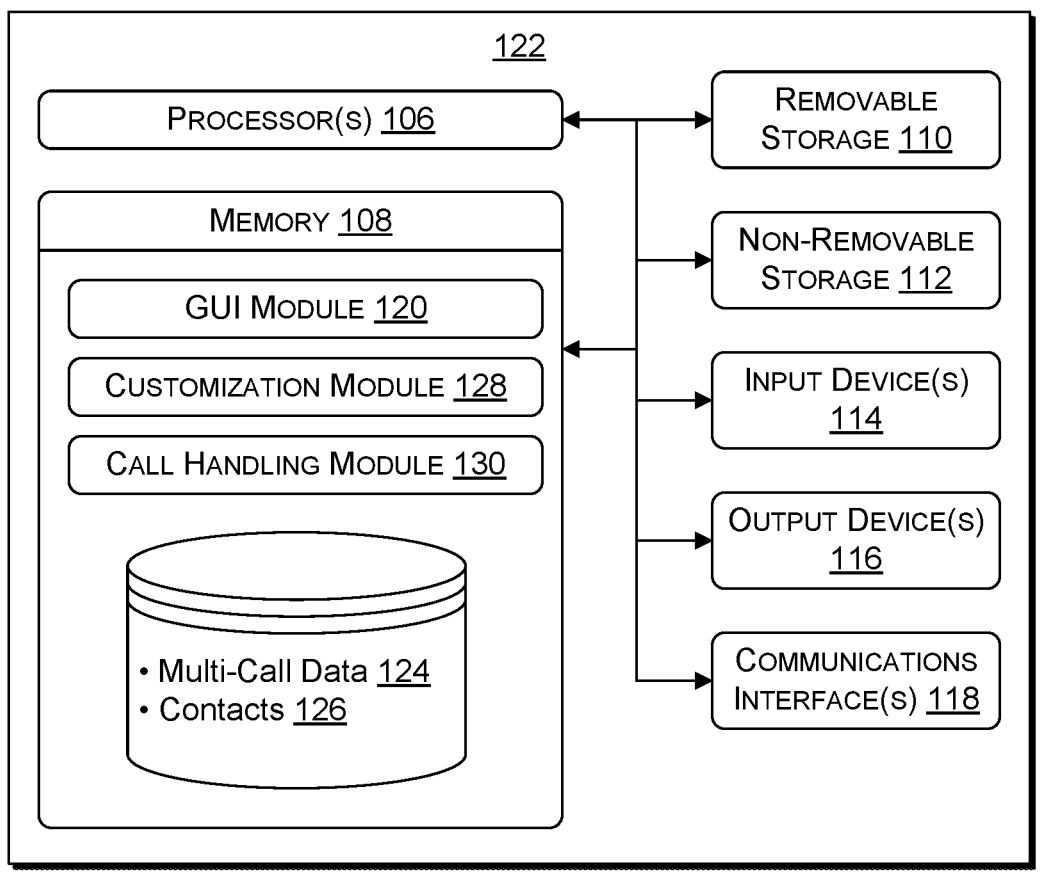
FIG. 1B illustrates an example computing device suitable for use in implementations of the technology described herein is provided.

Referring to FIG. 1B, a block diagram of an example of a computing device 122 suitable for use in implementations of the technology described herein is provided. In particular, the exemplary computer environment is shown and designated generally as the computing device 122. The computing device 122 is but one example of a suitable computing environment and is not intended to suggest any limitation as to the scope of use or functionality of the invention. Neither should the computing device 122 be interpreted as having any dependency or requirement relating to any one or combination of components illustrated. In aspects, the computing device 122 may be a base station. In another embodiment, the computing device 122 may be a UE capable of two-way wireless communications with an access point, such as UEs 102(0)-(2). Some non-limiting examples of the computing device 122 include a base station, a controller at a base station, a backhaul server, a personal computer, a cell phone, current UE, legacy UE, a tablet, a pager, a personal electronic device, a wearable electronic device, an activity tracker, a laptop, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With reference to FIG. 1B, the computing device 122 may include one or more processors 106 and one or more forms of computer-readable memory 108. The computing device 122 may also include additional storage devices. Such additional storage may include removable storage 110 and/or non-removable storage 112. In various embodiments, the computer-readable memory 108 comprises non-transitory computer-readable memory 108 that generally includes both volatile memory and non-volatile memory (e.g., random access memory (RAM), read-only memory (ROM), erasable programmable read-only memory (EEPROM), Flash Memory, miniature hard drive, memory card, optical storage, magnetic cassettes, magnetic tape, magnetic disk storage or other magnetic storage devices, or any other medium). The computer-readable memory 108 may also be described as computer storage media and may include volatile and nonvolatile, removable and non-removable media implemented in any method or technology for storage of information, such as computer readable instructions, data structures, program modules, or other data. Computer-readable memory 108, removable storage 110 and non-removable storage 112 are all examples of non-transitory computer-readable storage media. Computer-readable storage media include, but are not limited to, RAM, ROM, EEPROM, flash memory or other memory technology, compact disc read-only memory (CD-ROM), digital versatile disks (DVD) or other optical storage, magnetic cassettes, magnetic tape, magnetic disk storage or other magnetic storage devices, or any other medium which can be used to store the desired information and which can be accessed by the computing device 122. Any such computer-readable storage media may be part of the computing device 122.

The computing device 122 may further include input devices 114 communicatively coupled to the processor(s) 106 and the computer-readable memory 108. The input device(s) 114 can include, without limitation, a camera, a microphone, a keyboard/keypad, a touch screen (or touch-sensitive display), and the like. The user customizable call handling module 122 of the computing device 122 may further include output devices 116 communicatively coupled to the processor(s) 106 and the computer-readable memory 108. The output device(s) 116 can include, without limitation, a display, speakers, a tactile feedback mechanism, a printer, and the like. The computing device 122 may further include communications interface(s) 118 that allow the computing device 122 to communicate with other network elements, such as nodes of the communications network 104 and/or UEs, etc. The communications interface(s) 118 may facilitate transmitting and receiving wired and/or wireless signals over any suitable communications/data technology, standard, or protocol, as described herein. For example, the communications interface(s) 118 can comprise one or more of a cellular radio, a wireless (e.g., IEEE 802.1x-based) interface, a Bluetooth® interface, a wired modem or Ethernet port, and so on. The communications interface(s) 118 may further enable the UE 102(0) to communicate over circuit-switch domains and/or packet-switch domains.

Referring back to FIG. 1A, in general, a user can utilize the UE 102(0) to communicate with other users and associated UEs 102 (e.g., the UE 102(1) and the UE 102(2)) via the communications network 104. The communications network 104 may represent any suitable type of network, or combination of networks, including radio access networks (RANs), an Internet Protocol Multimedia Subsystem (IMS) network, (sometimes referred to as the "IMS core network," the "IMS core," the "IMS network," the "Core Network (CN)," or the "IM CN Subsystem"), the Internet, and/or any public or private network and related network hardware involved in the various wired and/or wireless communications and protocols described herein. The communications network 104 (which may include an IMS network) allows for peer-to-peer communications, as well as client-to-server communications over an IP-based network. When the communications network 104 includes an IMS network, the IMS network can be maintained and/or operated by one or more service providers, such as one or more wireless carriers ("operators"), that provide IMS-based services to users (sometimes called "subscribers") who are associated with the UEs 102. For example, a service provider may offer multimedia telephony services, among other services, that allow a subscribed user to call or message other users via the communications network 104 (including the IMS network) using his/her UE 102. In order to access these services (e.g., telephony services), a UE 102 is configured to request establishment of a communication session. In the case of telephony services, the communication session can comprise a call (e.g., a voice-based communication session, such as a VoLTE call). The communications network 104 can also support circuit switched (CS) calling when circuit switched networks are available.

The UE 102(0) may receive calls from more than one UE 102. The UE 102(0) may be used by a popular individual and/or an individual with a business who frequently receive calls for personal and/or business purposes. FIG. 1A shows that an active call can be established between the UE 102(0) and a first UE 102(1). This is an example of a "two-call" scenario where the UE 102(0) is tasked with handling two contemporaneous calls. "Contemporaneous" is used herein to denote calls that are either established, or requesting establishment, with the UE 102(0) in the same period of time. In order to establish a call, one of the UEs 102(0) or 102(1) can send a session request in the form of a Session Initiation Protocol (SIP) message using the SIP INVITE method via the communications network 104 to the other UE 102. SIP is a signaling protocol that can be used to establish, modify, and terminate multimedia sessions (e.g., a multimedia telephony call) over packet networks, and to authenticate access to IMS-based services. Other protocols can be additionally or alternatively used, e.g. Web Real-Time Communication, WebSocket. Once setup and authentication procedures are completed, a first call between callers of the UE 102(0) and the UE 102(1) can be considered a first active call established on the UE 102(0).

In other embodiments not illustrated in FIG. 1A, the UE 102(0) can receive a third incoming call from a third UE 102(3) while the first active call (i.e., the call with the first UE 102(1)) is already established on the UE 102(0) and while the second call (i.e., the call with the second UE 102(2)) is on hold with the UE 102(0). This is an example of a "three-call" scenario where the UE 102(0) is tasked with handling three contemporaneous calls. For example, each of the three UEs 102(1), 102(2), and 102(3) may have sent SIP INVITES to the UE 102(0) at different times to request establishment of respective calls with the UE 102(0). However, during a given period of time, the three calls can be considered "contemporaneous" if all of the calls are either established or in the process of being established (e.g., incoming, being setup, and the like) at the same time.

It is to be appreciated that, although FIG. 1A depicts single UEs 102 involved on either end of the individual calls (e.g., the active call and the call on-hold), any individual calls can represent a conference call where a conference bridge is established to connect multiple parties, rather than connecting two parties via non-conferencing technologies. Furthermore, it is to be appreciated that different three-call scenarios can occur. For example, another three-call scenario can occur when the UE 102(0) receives a third incoming call from the UE 102(3) while a first active call is already established with the UE 102(1) and while a second call from the UE 102(2) is incoming (as opposed to the second call being on-hold).

The techniques and systems described herein are equally applicable in any multi-call scenario involving any number of contemporaneous calls, including two, three, or more contemporaneous calls.

Referring back to FIG. 1B, the computer-readable memory 108 is shown as including various modules and data that, when executed by the one or more processors 106, can implement the various techniques and processes described herein. The memory 108 can include a GUI module 120 that is at least configured to present, on a display of the computing device 122, a set of selectable options for call handling in multi-call scenarios. For example, the GUI module 120 may be configured to present selectable options on the display of the computing device 122 in the form of tabbed screens, a list of soft buttons, or any similar interactive GUI elements, for selection by a user to provide user input (via a touch sensitive display of the computing device 122) in context of handling multiple contemporaneous calls on the computing device 122. The user can provide user input on the display of the computing device 122 by selecting a particular selectable option for handling an incoming call in a multi-call scenario. Such user input received in a multi-call scenario is considered to be user input that is received in context of handling multiple contemporaneous calls on the computing device 122. The GUI module 120 may also be configured to present three-dimensional ("3D") images on the display of the computing device 122, including holographic images, which may be generated by the one or more processors 106.

The memory 108 of the computing device 122 may include a customization module 128 for customizing settings pertaining to the handling of an incoming call in a multi-call scenario. For example, the customization module 128 can allow a user (via a settings menu or the like) to specify, and save, various preferences in relation to handling multiple contemporaneous calls. The computing device 122 can come with "out-of-the-box" settings for handling multiple contemporaneous calls. Accordingly, a call handling module 130 for an "out-of-the-box" computing device 122 without any user customization is configured to handle an incoming call in a multi-call scenario by presenting, on the display of the computing device 122 via the GUI module 120, a set of selectable options for handling the incoming call.

Figure 2:
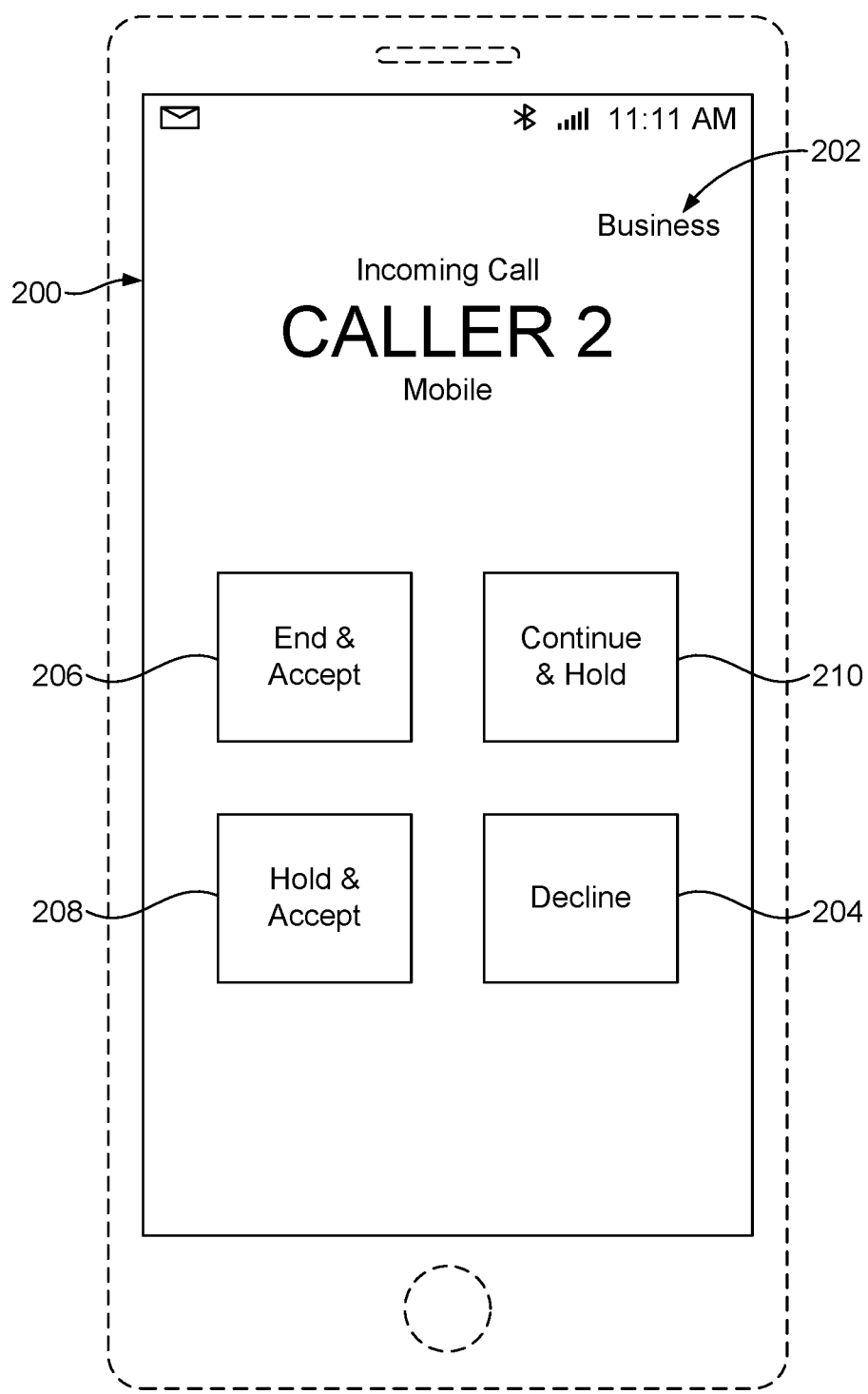
FIG. 2 illustrates an example graphical user interface (GUI) for handling an incoming call during a multi-call scenario.

With reference to FIG. 2, and continuing with the example multi-call scenario of FIG. 1A, FIG. 2 shows an example GUI 200 for the UE 102(0) for handling an incoming call from the UE 102(2) while the UE 102(0) is already engaged in a call with the UE 102(1). The incoming call from the UE 102(2) illustrated in FIG. 2 is shown as having a call type designator 202, such as "business" to indicate that the call from the UE 102(2) is from a business contact. In response to the incoming call from the UE 102(2) while the UE 102(0) is already engaged in a call with the UE 102(1), the GUI module 120 of the UE 102(0) may receive instructions from the call handling module 130 to present a default set of selectable options on a display of the UE 102(0) for selection by the user. The default set of selectable options can comprise the following: (i) a first selectable option 204 to decline the incoming call and send it to voicemail, e.g. DECLINE; (ii) a second selectable option 206 to answer the incoming call and end the active call and send it to voicemail, e.g. END & ACCEPT; (iii) a third selectable option 208 to answer the incoming call and put the active call on hold, e.g. HOLD & ACCEPT; (iv) a fourth selectable option 210 to continue with the active call and put the incoming call on hold, and send one or more communications to the UE 102(2) while UE 102(2) is on hold, e.g. CONTINUE & HOLD. Sending one or more communications to callers placed on hold is useful when the user of the UE 102(0) does not have a chance to inform those callers that he/she is placing their calls on hold. Accordingly, one or more communications may be sent with the third selectable option 208 and the fourth selectable option 210. FIG. 2 shows an example where the third selectable option 208 may not involve sending one or more communications to the caller of the active call because the user of the UE 102(0) may, instead, inform the active caller that he/she is about to place the active call on hold to answer an incoming call. However, one or more communications may be sent in option three as an alternative.

The one or more communications may take several forms. In embodiments, the one or more communications may comprise non-interactive messaging, such as but not limited to a video or audio message. In further examples, the non-interactive messaging may include audio messages with promotions, special offers, and/or breaking news. In other examples, the non-interactive messaging may include a standard hold script and/or a custom user hold script. In other embodiments, the one or more communications may comprise interactive messaging, such as but not limited to a video or audio message requiring the exchange of feedback. In still further embodiments, the one or more communications may comprise a hologram.

In some embodiments, the user can select an option by touching the touch-sensitive display to accept the selected option as is. In some embodiments, communication functionality can be toggled on and off with a gestural input, such as a "long press" (i.e., a press and hold for greater than a threshold amount of time). For example, if the user of the UE 102(0) wants to place an incoming call on hold from the UE 102(2) without sending one or more communications to UE 102(2) while UE 102(2) is on hold, he/she can press and hold the fourth option 210, which will put the active call on hold without sending one or more communications to the UE 102(1). Alternatively, a selectable option for placing an active call on hold without sending one or more communications to the active caller may be presented, and a long press or similar gesture received on the display can toggle communication functionality "on" so that one or more communications are sent to the active caller placed on hold when that option is selected. For example, a long press received on the third option 208 can place the active call and send a message to the active caller. Toggling communication functionality with a long press or similar gesture (e.g., double tap) allows for reducing the number of options presented on the display of the UE 102(0) to make it easier for the user to process the available options during a time sensitive situation where the user is to decide how to handle the incoming call.

It is to be appreciated that contact names can be utilized with the selectable options 204-210 instead of presenting a description of the call in question. For example, the fourth option 210 can be presented as "continue Brian and hold Jim," or something similar based on the contacts 126 available to the call handling module 130. The contact name for a given call can be determined from information in message headers (e.g., a SIP header), such as a phone number that is correlated with a phone number in the contacts 126 upon receiving an incoming call at the UE 102(0).

Of course, other types of selectable options can be presented on the display of the UE 102(0) as a default set of selectable options, and default sets of selectable options, and messages, can be customized (changed) by the user via the customization module 128. For example, in a "two-call" scenario, the aforementioned "long-press" gesture for toggling communication functionality can be omitted, and more selectable options can be presented, such as: (i) a first option to decline the incoming call; (ii) a second option to answer the incoming call and end the active call; (iii) a third option to answer the incoming call and put the active call on hold and not send one or more communications to the active caller; (iv) a fourth option to answer the incoming call, put the active call on hold, and send one or more communications to the active caller while the active caller is on hold; (v) a fifth option to continue with the active call and put the incoming call on hold and not send one or more communications to the incoming caller; and (vi) a sixth option to continue with the active call, put the incoming call on hold, and send one or more communications to the active caller while the active caller is on hold. Other variations are possible.

Whatever the default set of selectable options are, and whatever the default messages the system provides out-of-the-box, the customization module 128 can allow the user to customize these features. For example, the user can choose a preferred communication from a list (e.g., drop down list) of predetermined communications to use as a communication that is sent to a caller that is placed on hold. Alternatively, the user can create his/her own custom communication and save the communication for later use when a communication is to be sent to a caller that is placed on hold. The user-selected (or user-created) communication received by the customization module 128 can be globally applied to all callers, or the user can assign the custom communication to a particular class (e.g., business contact, personal contact, schoolmate, colleague, or any other type of class designator), or to a particular phone number (e.g., a first phone number that is a business phone number of the UE 102(0), a second phone number that is a personal phone number of the UE 102(0), etc.). This type of communication customization may allow the user to be more formal with business colleagues, and more casual with personal contacts. It also allows the user to write (or select) communications that "sound more like" the user because they are written (or selected) by the user.

When communications are customized via the customization module 128, these custom communications may be used with a selectable option in a set of selectable options, such as the selectable option 210 shown in FIG. 2. For example, if the user selects the fourth option 210 of FIG. 2 in a multi-call scenario, the communication selected for sending to the second UE 102(2) can comprise a user-customized communication (previously selected or written by the user via the customization module 128) that is either globally applied to all users, or assigned to a class of users of which the caller of the second call is a member, or the communication may have been assigned to a phone number of the UE 102(0) that the second call is connected with.

Figure 3:
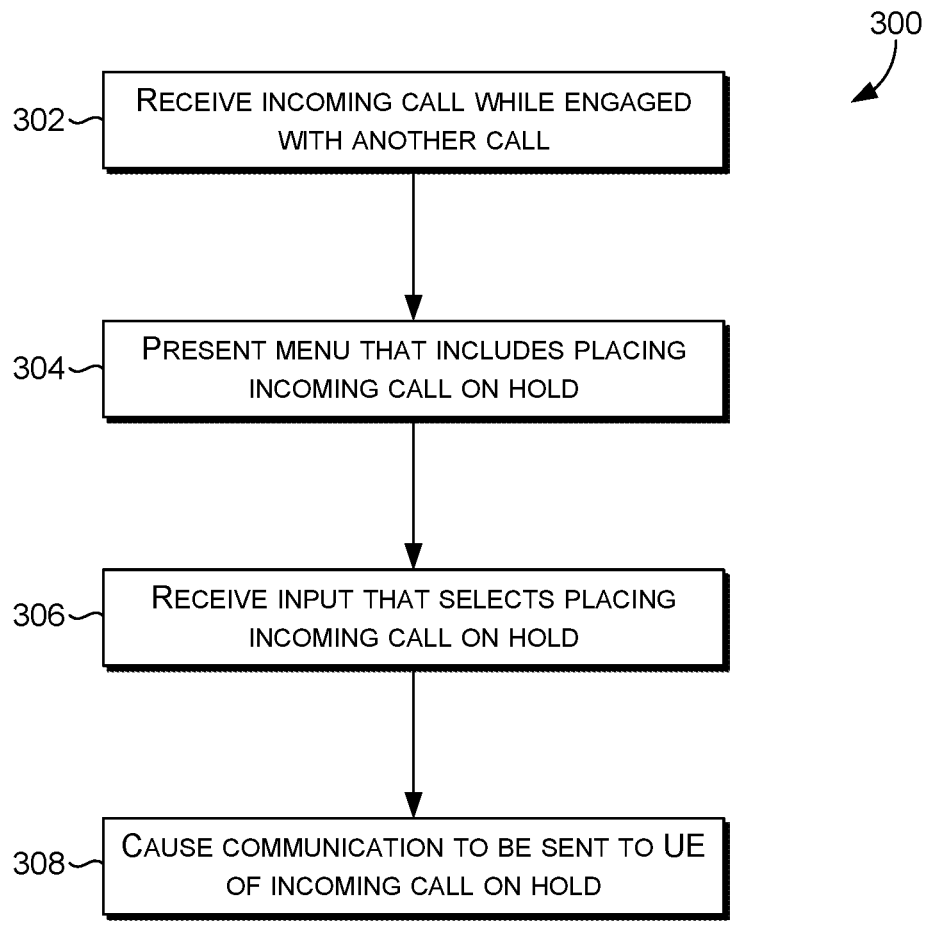
FIG. 3 is a flow diagram illustrating an example call-waiting method for a UE in accordance with embodiments of the present disclosure.

FIG. 3 is a flow diagram illustrating an example call-waiting method for a UE in accordance with embodiments of the present disclosure. Initially, at block 302, a first UE may receive a second voice call from a second UE while the first UE is engaged in a first call. For example, the user of the first UE may be a small business owner engaged in a conference call with investors. While engaged in this conference call, the user of the first UE may receive a voice call from the user of a second UE, such as a potential customer. At block 304, a menu is caused to be presented on a display of the first UE. In embodiments, the menu may comprise an option to place the second voice call on hold. In an example, the menu on the display of the first UE may appear similar to that illustrated in FIG. 2. At block 306, the first UE may receive a touch input indicating a selection to place the second voice call on hold. For example, the user of the first UE may tap that portion of the display of the first UE associated with holding an incoming call. At block 308, one or more communications may be caused to be sent to the second UE while the second voice call is on hold. For example, after the user of the first UE taps that portion of the display associated with holding an incoming call, this may cause directly or indirectly one or more communications to be sent to the second UE while the second voice call is on hold, such as an interactive video to engage the second user so that the user does not hang up while on hold.

Figure 4:
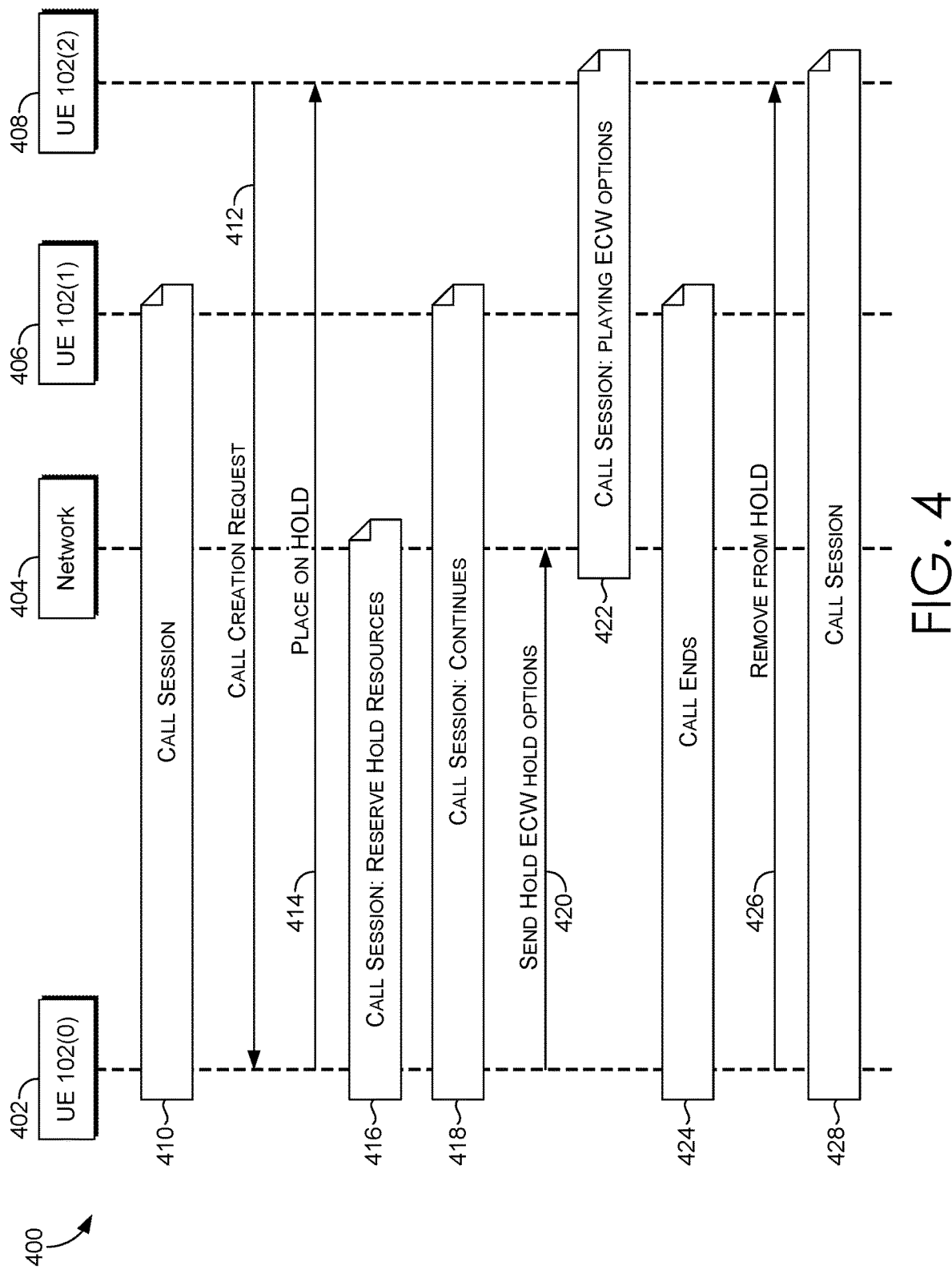
FIG. 4 is a call flow diagram illustrating an example call-waiting method for a UE in accordance with embodiments of the present disclosure.

FIG. 4 illustrates a call flow diagram 400 in one example in accordance with embodiments of the present disclosure. At step 410, the UE 102(0) 402 and the UE 102(1) 406 are already engaged in a call session over network 404. At step 412, the UE 102(2) 408 sends the UE 102(0) 402 a message to initiate a voice call, such as a Call Creation Request. At step 414, the UE 102(0) 402 sends a message to the UE 102(2) 408 to place the UE 102(2) 402 on hold, such as a Place on HOLD message, without beginning a communication session with the UE 102(2) 408. At step 416, the UE 102(0) 402 sends a message to the communications network 404, such as the IMS network, requesting that resources be reserved/allocated for a hold-time interaction with the UE 102(2) 408. At step 418, the UE 102(0) 402 and the UE 102(1) 404 continue their existing voice call. At step 420, UE 102(0) 402 sends the network 404 enhanced call waiting (ECW) hold options. At step 422, the network 404 plays the ECW hold options to the UE 102(2) 408, such as one or more interactive and/or non-interactive video and/or audio files. At step 424, the call session between the UE 102(0) 402 and the UE 102(1) 406 ends. At step 426, UE 102(0) 402 sends a message to the UE 102(2) to remove the UE 102(2) 408 from hold, such as a Remove from Hold message, and in step 428, a call session between the UE 102(0) 402 and the UE 102(2) 408 begins.

Finally, regarding FIGS. 1 through 4, it will be understood by those of ordinary skill in the art that the environment(s), system(s), and/or methods(s) depicted are not intended to limit the scope of use or functionality of the present embodiments. Similarly, the environment(s), system(s), and/or methods(s) should not be interpreted as imputing any dependency and/or any requirements with regard to each component, each step, and combination(s) of components or step(s) illustrated therein. It will be appreciated by those having ordinary skill in the art that the connections illustrated the figures are contemplated to potentially include methods, hardware, software, and/or other devices for establishing a communications link between the components, devices, systems, and/or entities, as may be utilized in implementation of the present embodiments. As such, the absence of component(s) and/or steps(s) from the figures should not be interpreted as limiting the present embodiments to exclude additional component(s) and/or combination(s) of components. Moreover, though devices and components in the figures may be represented as singular devices and/or components, it will be appreciated that some embodiments can include a plurality of devices and/or components such that the figures should not be considered as limiting the number of devices and/or components.

It is noted that aspects of the present invention are described herein with reference to block diagrams and flowchart illustrations. However, it should be understood that each block of the block diagrams and/or flowchart illustrations may be implemented in the form of a computer program product, an entirely hardware embodiment, a combination of hardware and computer program products, and/or apparatus, systems, computing devices/entities, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some embodiments, retrieval, loading, and/or execution may be performed in parallel such that multiple instructions are retrieved, loaded, and/or executed together. Thus, such embodiments can produce specifically configured machines performing the steps or operations specified in the block diagrams and flowchart illustrations. Accordingly, the block diagrams and flowchart illustrations support various combinations of embodiments for performing the specified instructions, operations, or steps.

Additionally, as should be appreciated, various embodiments of the present disclosure described herein can also be implemented as methods, apparatus, systems, computing devices/entities, computing entities, and/or the like. As such, embodiments of the present disclosure can take the form of an apparatus, system, computing device, computing entity, and/or the like executing instructions stored on a computer-readable storage medium to perform certain steps or operations. However, embodiments of the present disclosure can also take the form of an entirely hardware embodiment performing certain steps or operations.

Many different arrangements of the various components depicted, as well as components not shown, are possible without departing from the scope of the claims below. Embodiments of our technology have been described with the intent to be illustrative rather than restrictive. Alternative embodiments will become apparent to readers of this disclosure after and because of reading it. Alternative means of implementing the aforementioned may be completed without departing from the scope of the claims below. Certain features and subcombinations are of utility and may be employed without reference to other features and subcombinations and are contemplated within the scope of the claims.

The invention claimed is:

1. A method in a communications network comprising:
receiving, by a first user equipment (UE), a second voice call from a second UE while the first UE is engaged in a first voice call;
causing a presentation of a menu on a display of the first UE,
wherein the menu comprises an option to place the second voice call on hold;
receiving by the first UE a touch input indicating a selection to place the second voice call on hold,
wherein the first UE maintains the first voice call; and
causing one or more communications to be sent to the second UE while the second voice call is on hold,
based on customizable settings pertaining to handling an incoming call in a multi-call scenario.

2. The method of claim 1, wherein the one or more communications comprise non-interactive messaging.

3. The method of claim 2, wherein the non-interactive messaging comprises a video.

4. The method of claim 2, wherein the non-interactive messaging comprises an audio message.

5. The method of claim 1, wherein the one or more communications comprise interactive messaging.

6. The method of claim 5, wherein the interactive messaging comprises a video.

7. The method of claim 1, wherein the one or more communications comprise a hologram.

8. A system in a communications network, the system comprising:
a processor; and
one or more computer storage hardware devices storing computer-usable instructions that, when used by the processor, cause the processor to:
receive a second voice call from a second UE while a first UE is engaged in a first voice call;
cause a presentation of a menu on a display of the first UE, wherein the menu comprises an option to place the second voice call on hold,
wherein the first UE maintains the first voice call;
receive a touch input indicating a selection to place the second voice call on hold; and
cause one or more communications to be sent to the second UE while the second voice call is on hold,
based on customizable settings pertaining to handling an incoming call in a multi-call scenario.

9. The system of claim 8, wherein the one or more communications comprise non-interactive messaging.

10. The system of claim 9, wherein the non-interactive messaging comprises a video.

11. The system of claim 9, wherein the non-interactive messaging comprises an audio message.

12. The system of claim 8, wherein the one or more communications comprise interactive messaging.

13. The system of claim 12, wherein the interactive messaging comprises a video.

14. A non-transitory computer readable storage media having stored thereon non-transitory executable instructions that when executed by a processor of a computing device controls the computing device to perform steps for a call waiting method, the steps comprising:
receiving a session initiation protocol (SIP) message a second voice call from a second UE to initiate a second voice call while a first UE is engaged in a first voice call;
causing a presentation of a menu on a display of the first UE,
wherein the menu comprises an option to place the second voice call on hold;
receiving a touch input indicating a selection to place the second voice call on hold; and
causing one or more communications to be sent to the second UE while the second voice call is on hold,
wherein the first UE maintains the first voice call,
based on customizable settings pertaining to handling an incoming call in a multi-call scenario.

15. The non-transitory computer-readable storage media of claim 14, wherein the one or more communications comprise non-interactive messaging.

16. The non-transitory computer-readable storage media of claim 15, wherein the non-interactive messaging comprises a video.

17. The non-transitory computer-readable storage media of claim 15, wherein the non-interactive messaging comprises an audio message.

18. The non-transitory computer-readable storage media of claim 14, wherein the one or more communications comprise interactive messaging.

19. The non-transitory computer-readable storage media of claim 18, wherein the interactive messaging comprises a video.

20. The non-transitory computer-readable storage media of claim 14, wherein the one or more communications comprise a hologram.

* * * * *